Nov. 17, 1925.                                                1,562,193
                            C. P. RYAN
        SUBMARINE SOUND SIGNALING OR INDICATING APPARATUS
                    Original Filed Jan. 12, 1924
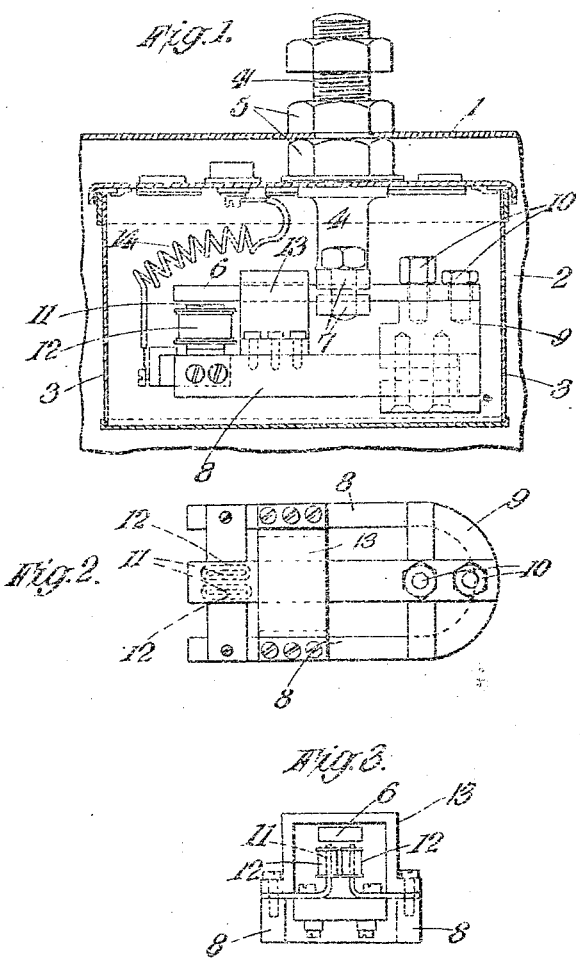
Inventor
Cyril Percy Ryan
By
Pennie, Davis, Marvin, Edmonds
Attorneys Patented Nov. 17, 1925.

1,562,193

UNITED STATES PATENT OFFICE.

CYRIL PERCY RYAN, OF EAST MOLESEY, ENGLAND, ASSIGNOR TO VICKERS LIMITED, OF WESTMINSTER, ENGLAND, A BRITISH COMPANY.

SUBMARINE SOUND SIGNALING OR INDICATING APPARATUS.

Original application filed January 12, 1924, Serial No. 685,904. Divided and this application filed March 19, 1925. Serial No. 16,685.

*To all whom it may concern:*

Be it known that I, CYRIL PERCY RYAN, a subject of the King of Great Britain, residing at Shotley House, East Molesey, in the county of Surrey, England, have invented certain new and useful Improvements in Submarine Sound Signaling or Indicating Apparatus, of which the following is a specification.

This invention relates to apparatus for the reception of sound waves under water, for use in submarine sound signaling and in indicating the passage of submerged or above water vessels through a waterway, the chief object of the invention being to provide a hydrophone device of magnetophone type which is extremely sensitive to any under water disturbances.

In the improved hydrophone the electromagnetic transmitting device or magnetophone is mounted in a casing secured to a sound receiving diaphragm, the magnetophone comprising a reed clamped to the member secured to the diaphragm so that the reed receives the diaphragm vibrations. The reed carries through a bracket at one end a permanent magnet, the other end of which magnet has pole pieces carrying magnetophone coils and closely approaching the free end of the reed.

In order that the said invention may be clearly understood and readily carried into effect the same will now be described more fully with reference to the accompanying drawings, in which :—

Figure 1 is a part section of apparatus embodying the magnetophone sound receiver and transmitter; and Figures 2 and 3 are, respectively, an elevation and a plan of details of the device shown in Figure 1.

The sound receiving diaphragm 1 (which is fitted to a vessel 2 in any suitable manner) carries the complete electromagnetic device in a casing 3, the device being fitted to the diaphragm 1 by the central bolt 4 and clamping nuts 5. The magnetophone comprises the reed 6 which is clamped at about the middle to the centre bolt 4 and consequently to the diaphragm 1 by means of the clamp 7, so that the diaphragm vibrations are transmitted from the centre of the diaphragm to the reed 6. A permanent magnet 8, preferably of horseshoe type, is secured at its rounded end to the bracket 9, which in its turn is fixed by the studs 10 on one end of the reed 6, which, therefore, carries the magnet in an unsymmetrical manner. The other end of the magnet is provided with pole pieces 11 which carry the magnetophone coils 12. The pole pieces 11 may be in the form of soft iron strips secured upon the ends of the magnet. The free end of the reed 6 lies closely above the extremities of the pole pieces and on any vibration of the reed occurring the magnetic flux through the coils 12 is altered and currents corresponding to the amplitude of the oscillations are induced in the coils. As the magnet and its supporting bracket are carried on the reed at one end only the inertia of the supported parts allows of substantial amplitude of vibration of the free end of the reed relatively to the magnet poles. The magnet 8 may carry a shielding bracket 13 which extends over the free portion of the reed, but allows a clearance for vibration. The magnetophone current passes through the lead 14 to the transmitting cable and thence to the receiving station.

It will be seen that any vibration of the diaphragm 1 (which may be part of the skin of the vessel 2) due to submarine sound disturbances will vibrate the reed through the central bolt 4, which forms a rigid connection between the diaphragm and the reed. As the mounting of the magnet on the reed is unsymmetrical, and the end of the reed which lies over the magnet poles 11 is free, the free end of the reed will vibrate relatively to the magnet at substantial amplitudes owing to the inertia of the parts and the unsymmetrical mounting.

What I claim and desire to secure by Letters Patent of the United States is:—

1. In submarine sound receiving apparatus, a diaphragm sensitive to submarine sound vibrations, a reed secured rigidly to the said diaphragm, a magnet fixed at one end upon one end of the said reed, magnet poles extending toward and close to the opposite end of the said reed, which is free and is situated on the other side of its point of attachment to the diaphragm, and coils mounted upon the said magnet poles upon the side of the magnet adjacent to the said reed and connected up in the receiving circuit.

2. In submarine sound receiving apparatus as in claim 1, a bracket rigidly mounted upon one end of the said reed and adapted to receive the end of the magnet so as to secure it upon the reed in spaced position.

3. In submarine sound receiving apparatus as in claim 1, an enclosing casing mounted upon the sound receiving diaphragm by the same securing means as the said reed, the casing completely enclosing the reed and magnet device.

CYRIL PERCY RYAN.